Patented Feb. 9, 1937

2,069,828

UNITED STATES PATENT OFFICE 2,069,828

PRINTING INK

Herbert A. Hauptli, Evanston, Ill., assignor to Sears, Roebuck and Co., Chicago, Ill., a corporation of New York No Drawing. Application February 15, 1935, Serial No. 6,642

10 Claims. (Cl. 134—17)

The invention relates to printing inks and the general aim is to provide a new and improved ink having inherent properties which overcome serious disadvantages now present in commercial inks and render it eminently suitable for practically all types of printing.

In the printing industry rapidity with which an ink dries is an important consideration, since, among other things, the speed of the press is dependent thereon. At present there is no ink, in so far as is known, which may be used in practically all printing operations, as rotograveur, multicolor printing operations, embossing, intaglio and ordinary work, and which will dry with sufficient rapidity to permit the press to be operated at efficient speeds. Hence, conventional practice necessitates resort to means to prevent the transfer or offset of wet ink by such cost increasing methods as slip-sheeting, doctoring of the ink, or by paraffin spraying. In many instances heat is applied to accelerate drying, and oftentimes the printed web or sheets traverse a long path or are stacked for drying, thus increasing the floor space required and the cost. Where any of these processes are used, or where the ink is allowed to dry naturally, the margins of the impression may easily lose sharpness and definiteness of outline through smearing or running of the ink.

Furthermore commercial inks utilize an oil or drying medium of some nature as at least a part of the base carrying agent or vehicle which functions through a chemical change, usually oxidation, to dry the ink and impart permanency thereto. As a result, any small particles which may not be removed from the wells of the printing plate (and this is a frequent occurrence) dries therein and must be removed by scrubbing or other cleaning operation. Should the press stand idle for a period ample to allow the ink on the plate to dry, the press cannot again be operated unless the printing plates are first cleaned.

An object of the invention is to provide an improved printing ink which dries practically instantaneously upon application whereby to eliminate expedients for accelerating drying, to avoid the provision of drying space, and to permit the press to be operated at top speed without requiring the use of offset preventing means, without incurring transfer of ink and without in any manner impairing the original sharpness of the impressions.

Another object is to provide an improved ink of this nature which is oil-free and non-oxidizing in character and which embodies a base material which will become permanently bonded to a surface without chemical change upon deposition thereon merely by volatilization of a carrier solvent.

Another object of the invention is to provide a fluid ink embodying a carrier liquid which will volatilize substantially instantly upon deposition of the ink in a printing operation, leaving as a residue a dry, water-insoluble, resinous base self-bonded to the printed surface without chemical change and permanently incorporating a color.

Other objects and advantages will become apparent as the description proceeds.

As a base material for the ink, it is preferred to use resinous, hydrocarbon compounds such as derivatives of rubber in the nature of polymerized reaction products having properties substantially different from those of the rubber from which it is obtained. Characteristically, it is preferred to use the reaction products resulting from the treatment of rubber with certain amphoteric metal salt compounds of the heavier halides. It appears that the metals which may be used are of the polyvalence order and are in such combination with the halide that, in theory, the salt has reserve or secondary valences which are unsatisfied whereby the salt may be combined as an addition product with an unsaturated hydrocarbon rubber base, as for example, molecular multiples of isoprene, and later be caused to split off forming the rubber polymer.

Satisfactory compounds include, in the main, the halide salts (excepting the fluorides) of tin, aluminum, antimony, iron, zinc, bismuth, chromium, boron, manganese and titanium, as well as certain of the metal halide acids such as the hydrated chlorostannous, chlorostannic, bromostannous, or bromostannic acids. The desired polymer is derived as the reaction product obtained by the treatment of rubber, either in plastic mass form or in solution with such a solvent as benzene, with a proper quantity of the selected salt or acid.

For particular illustration, stannic chloride or hydrated chlorostannic acid is added to a benzene solution of rubber and the reaction allowed to proceed either with or without heating. When a suitable agency, such as alcohol, is added to the reaction product, the halide salt is split off and in the resulting precipitate it is found that the rubber groups have polymerized to a heavier molecular grouping. Instead of adding the metal halide compounds to a solution of the rubber base, addition may be made by milling the selected compound into a plastic rubber mass upon ordinary mill rollers. The reaction is exothermic and the rubber polymer is obtained.

The rubber polymer obtained as a precipitate when the metal halide is split off is water-insoluble and has been found eminently satisfactory as a base for a printing ink having the desired properties originally outlined. A color may be readily and permanently incorporated in such a base and it has been found that the reduction of the base, to a proper fluid state, produces an ink having surprisingly advantageous properties when fluidity is obtained by a liquid which is a good solvent of the base, is highly volatile but otherwise relatively inert, and produces a tacky fluid which will adhere instantly and firmly to a clean surface but not to one wetted with the ink or solvent. Such an ink has the property of ready adherence to a surface to be printed, dries instantly upon application to a surface, and because of the characteristics inherent in the resinous, rubber hydrocarbon base, the residue bonds itself permanently to the surface without chemical change.

The color employed may be widely selected from the various commercial pigments, lakes or other well known materials which may be had in substantially pure, oil-free form. It is preferred that the color material be free of inert ingredients which might impart an abrasive quality to the ink. Preferably the color material is added to the rubber base polymer while it is being worked on a mill, the quantity of color material being determined by the tint desired up to a fully saturated condition of the base, depending upon the nature of the color material employed.

When the mixed base and color substances have been worked on the mill until the color is homogeneously dispersed, the material is a heated, viscous, resin-like mass which, upon cooling, becomes brittle and is capable of being ground into a relatively finely divided condition. To such material the carrying agent is added, this agent being characterized by its property of taking the material into solution in practically all concentrations, by forming therewith a fluid material which has the proper tackiness to permit its use as a printing ink, by being relatively volatile so that the liquid will dry quickly, and by being substantially non-oxidizing. Naphtha has been found suitable as possessing all of these characteristics, while other solvents of similar nature, such as carbon tetrachloride, may be used. Naphtha, however, is preferred because of its low cost and its properties which make it definitely suitable for all purposes. The quantity of solvent used will be determined by the type of ink required for work of a particular character, but naphtha will produce inks which vary in consistency throughout the usable range of viscosity.

Ink produced in accordance with this disclosure possesses all of the characteristics and properties which are essential for practically every type of printing operation and practice. The ink comprises essentially only three ingredients, namely, the polymerized rubber base, the color and the solvent. Hence, the act of compounding the ink is simple and readily performed yet uniformity of the product can be easily maintained. The readily volatile solvent in the absence of any other carrier, drier or similar ingredient, imparts an exceedingly rapid drying property to the ink to the extent that the ink, to all appearances, becomes instantaneously dry and will neither transfer to the surface of a succeeding roll or to the surface of an opposing sheet. Consequently, printing machines of the type now in commercial use can be run at maximum speed without offset, thus eliminating the use of conventional slip-sheeting, ink-doctoring, spraying, or other means for overcoming this trouble. Notwithstanding high speed of operation, perfectly sharp impressions are obtained.

The ink is completely oil free, there being no oxidizing agent of any nature therein except for the possible oxidation of the rubber polymer base itself which is so slow that it may be disregarded. An important advantage of the present ink results from the fact that an oil or drying agent is unnecessary. Thus, no chemical change in the ink occurs during drying so that the ink remains solvent in the carrier agent. It is, therefore, possible to let the printing element stand idle for substantial periods of time and then commence the printing operation without cleaning the dried ink from the printing element. This has not heretofore been possible, but with the present ink the first few movements of the printing element (whereby fluid ink is applied over the dried ink thereon) serves completely to dissolve the dried ink. From an economical and time-saving standpoint this feature is of exceeding importance.

Another result derived from the properties of this ink is the capacity of the ink to be stripped or removed cleanly and completely from the wells or pockets of the printing plate. Theoretically it is believed that this feature is the result of several factors. One inherent physical property is that the ink is quite tacky when contacted by a clean, dry article but not in the least so when touched with an ink or solvent coated object. Since the solvent is so volatile, the printing plate appears to become coated with a thin film of the carrier agent which serves somewhat as a lubricant so that the ink has little adhesion to the plate. Moreover, the non-oxidizing nature of the ink and the ready solubility of the dried ink prevents building up of accumulations of ink in the wells. Whatever the underlying reason, the present ink will transfer cleanly from the printing element with complete emptying of every well in the printing plate regardless of size.

Ink embodying the foregoing features, therefore, constitutes a decided advance in the art. The ease with which it may be uniformly compounded, the speed with which it dries, the sharpness of outline obtainable, its non-oxidizing, chemically stable character are features which overcome disadvantages inherent in known commercial inks. Moreover, the present ink, since it consists of a water insoluble base, is water-proof.

I claim as my invention:

1. Ink having a basic material derived from rubber by the action therewith of an amphoteric metal halide compound, a color material having an affinity for said basic material to permit dispersion thereof in said material, and a volatile oil-free non-oxidizing vehicle.

2. Ink containing as a base a reaction product of rubber and an amphoteric metal halide compound.

3. Ink containing a polymer derived from a reaction between an unsaturated rubber hydrocarbon and a tin compound of one of the halides chlorine, bromine and iodine.

4. A printing ink composed of a dry water-insoluble base comprising the product resulting from a polymerizing reaction between a rubber hydrocarbon and an amphoteric metal halide salt and having coloring matter on the order of a lake or pigment homogeneously incorporated therein, and a vehicle for said base and coloring matter characterized in that it is non-oxidizing, highly volatile, and is a good solvent of said base.

5. A printers ink consisting of a reaction product of a hydrocarbon such as rubber and an amphoteric metal halide salt, a coloring material uniformly dispersed in said product, and a highly volatile non-oxidizing vehicle in which said product is readily soluble.

6. A printing ink characterized in that immediately upon application to a dry surface a dry deposit consisting solely of a reaction product of an amphoteric metal halide salt and a hydrocarbon such as rubber and carrying a coloring material becomes firmly and inseparably self-bonded to said surface.

7. Ink containing a polymer derived from a reaction between an unsaturated rubber hydrocarbon and a tin compound of chlorine.

8. Ink containing a polymer derived from a reaction between an unsaturated rubber hydrocarbon and a metal halogen compound, the metal being of the empirical group comprising tin, aluminum, antimony, iron, zinc, bismuth, chromium, boron, manganese and titanium, and the halide being of the group chlorine, bromine and iodine.

9. In containing a polymer derived from a reaction between an unsaturated rubber hydrocarbon, and a compound of a metal from the empirical group comprising tin, aluminum, antimony, iron, zinc, bismuth, chromium, boron, manganese and titanium, with chlorine.

10. Oil free ink containing a solution of a polymerized hydrocarbon derived from the reaction product of a rubber hydrocarbon and an amphoteric metal halide salt.

HERBERT A. HAUPTLI.